April 21, 1925.  V. E. McMULLEN ET AL  1,534,983
FRICTION CLUTCH PULLEY
Filed Aug. 13, 1921
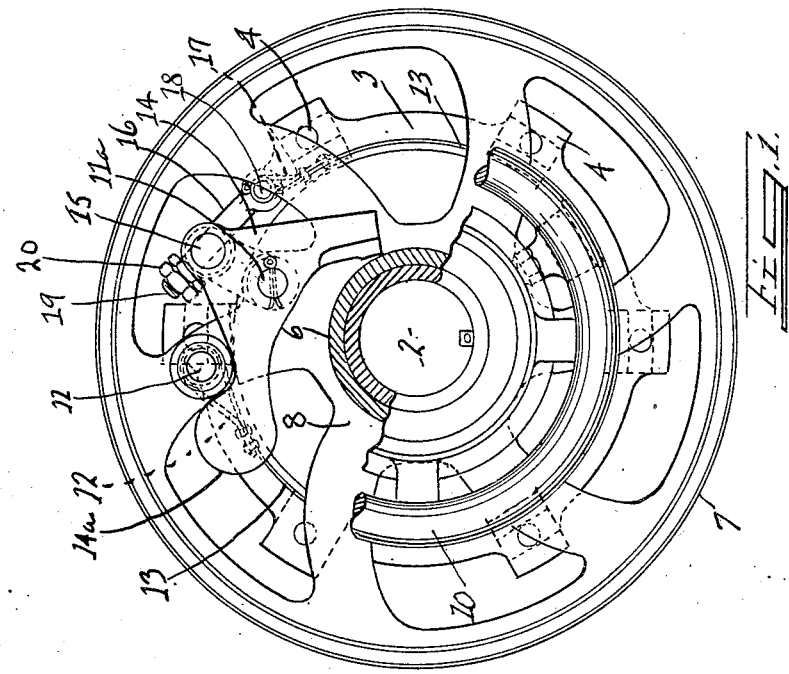
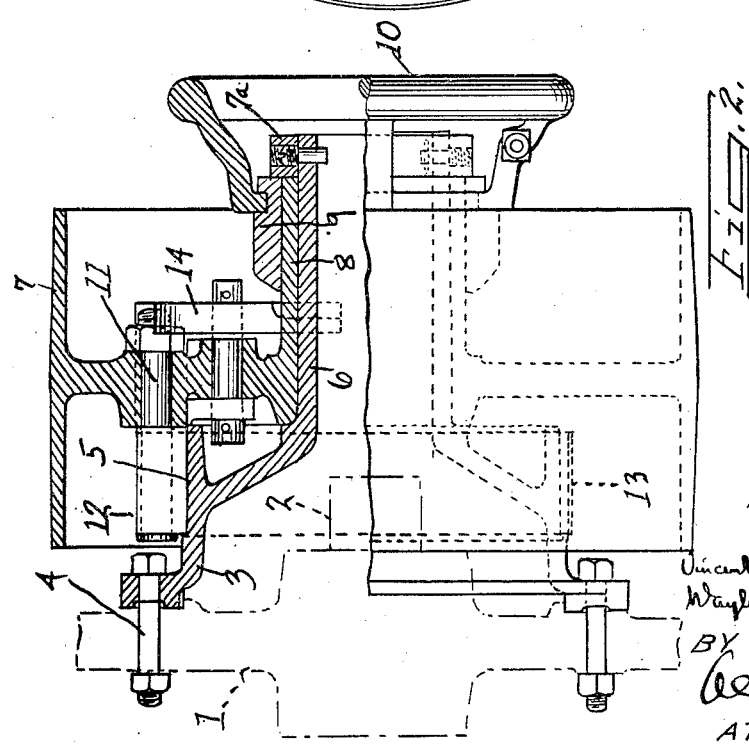
INVENTORS
ATTORNEYS.

Patented Apr. 21, 1925.

1,534,983

UNITED STATES PATENT OFFICE.

VINCENT E. McMULLEN AND WAYLAND E. WOODRUFF, OF EVANSVILLE, INDIANA, ASSIGNORS TO THE HERCULES GAS ENGINE COMPANY, OF EVANSVILLE, INDIANA, A CORPORATION OF INDIANA.

FRICTION-CLUTCH PULLEY.

Application filed August 13, 1921. Serial No. 491,899.

*To all whom it may concern:*

Be it known that we, VINCENT E. McMULLEN and WAYLAND E. WOODRUFF, citizens of the United States, and residents of Evansville, in the county of Vanderburgh and State of Indiana, have invented certain new and useful Improvements in Friction-Clutch Pulleys, of which the following is a full, clear, and exact description, reference being had to the accompanying drawings, forming part of this specification.

Our invention relates to clutch pulleys, more particularly as designed for use with farm engines wherein it is advantageous to mount the clutch and pulley device directly on the fly wheel of the engine.

It is the object of our invention to provide a band friction clutch, in connection with a spider, whereby the spider may be bolted to the engine fly wheel, and the clutch accordingly set up without calling for fitting to the crank shaft or any particular crank shaft clearance.

It is also our object to couple the clutch band to the pulley itself by a connection having a single point of adjustment thereby limiting the operative parts of the friction adjustment to a single nut, instead of several nuts or screws as in the usual constructions.

Then again the adjustment can be made while the engine and spider are running, since the friction band and pulley are both idle, unless the adjustable operating part has been thrown to active position.

We accomplish the objects above set forth and other advantages to be noted by that certain construction and arrangements of parts to be hereinafter more specifically pointed out and claimed.

In the drawings,

Figure 1 is an end elevation of the device.

Figure 2 is a longitudinal section thereof, said view being partly in side elevation.

As shown, the device is attached to the fly wheel 1 of an engine, said fly wheel being mounted on the shaft 2 of the engine. A spider 3 is provided, same being bolted to the fly wheel at 4, 4, and formed with a hollow body, or else cored out in some desired way to give entire freedom from contact with the end of the engine shaft, should it protrude from the fly wheel.

The spider is divided into what may be termed three portions, the portion bolted to the fly wheel, which has already been noted, and the portion 5, around which the friction band is to engage, and the portion 6 on which is loosely journaled the pulley hub.

The pulley is shown at 7, having a hub 8 on the portion 6 of the spider, and the conical operating sleeve 9 is shown as sliding on the pulley hub 8. It has a revoluble hand wheel 10 for operating it, and a stop collar 7ª on the hub 6 of the spider to hold it against flying off.

Secured to a pin 11, that is journaled in the web or a spoke of the pulley, dependent upon its construction, is the end piece 12, of a friction band 13, that bears on the spider portion 5. Another pin 11ª also carries an angle shaped lever 14, one end of which lies in the path of the conical sleeve 9, so as to be thrust outwardly thereby, and the other end carries a weight 14ª which flies out centrifugally when the sleeve 9 is removed.

At the apex of the angle of the lever is a pin 15, that supports a fitting 16 which is pivotally secured to the other terminus of the friction band. Thus the friction band is coupled to a strap 17, which terminates in a pin 18, to which is secured a rod 19. The rod 19 is passed through the pin 15 and held adjustably by the nut 20 to give the proper tension to the band.

When the lever is rocked, as by pushing in the conical sleeve, the angle portion thereof will carry the end of the friction band around the portion 5 of the spider, which will result in the friction band being clamped over the spider, and hence the pulley coupled to the spider, through the medium of the friction band mounting.

When wear has taken place, the nut or nuts at 20 may be adjusted, which will tighten the friction band to the desired degree, without affecting the operation of the lever, this being, as noted, a single point of adjustment for the entire device.

This adjustment is not only simple and readily accomplished, but it may be done with the engine and spider running, but the friction band loose, and the pulley stationary.

A hand wheel, as the operating part of the conical sleeve, is shown as exemplary only, as other means could readily be devised, dependent upon the necessities of individual installations. It is our preferred form in general practice as it can be safely operated from any point.

Having thus described our invention, what we claim as new and desire to secure by Letters Patent, is:—

In a friction clutch in combination with a fly wheel on a rotatable shaft, a spider mounted on said fly wheel, hub portions on the spider, a pulley loosely mounted on one hub portion, and an open friction band retained on one end by the pulley, said band adapted to engage the other hub portion, a three armed triangle shaped lever pivotally mounted on the pulley, one arm of said lever retaining a bolt, said bolt retaining the other end of the friction band, lock nuts for the bolt for adjusting the band, and a sleeve slidable on said pulley to engage another arm of the lever to tighten the band, and a weight disposed on the third arm of the lever for loosening said band coincident with the withdrawal of the slidable sleeve from engagement.

VINCENT E. McMULLEN.
WAYLAND E. WOODRUFF.